(12) United States Patent
Komazawa et al.

(10) Patent No.: US 6,394,779 B1
(45) Date of Patent: May 28, 2002

(54) MOLDING TOOL FOR MOLDING WITH CYLINDRICAL CORE

(75) Inventors: Toshio Komazawa; Yoshikazu Tsujimoto; Takeo Iwai, all of Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 0 days.

(21) Appl. No.: 09/894,948

(22) Filed: Jun. 28, 2001

(51) Int. Cl.[7] .............................................. B29C 45/14
(52) U.S. Cl. ........................ 425/123; 264/262; 425/124; 425/556; 425/572
(58) Field of Search ................................ 425/556, 572, 425/588, 116, 127, 129.1, 112, 123, 124; 264/262

(56) References Cited

U.S. PATENT DOCUMENTS 3,608,049 A * 9/1971 Tavella ........................ 264/229
6,094,818 A * 8/2000 Ogawa et al. ............... 264/262
6,125,539 A * 10/2000 Ogawa et al. ............... 264/262

FOREIGN PATENT DOCUMENTS

JP 5-28020 7/1993
JP 7-276382 10/1995

* cited by examiner

Primary Examiner—Tim Heitbrink
(74) Attorney, Agent, or Firm—Jordan and Hamburg LLP

(57) ABSTRACT

The present invention provides a molding tool capable of forming a molding with a cylindrical core while ensuring the discharge of the air in the vicinity of an upper end portion and forming no end face burr. As the device for this molding tool, an upper mold 10 and a lower mold 20, as can be clamped, are provided with insert dies 12 and 22 having fitting hole portions 14 and 24 at their centers. The lower fitting hole portion 24 is provided with a support pin 25 to be fitted in the cylindrical core 1 thereby to retain the cylindrical core 1, and the upper fitting hole portion 14 is provided with a core holder 15 so that a cavity 30 is formed around the outer circumference of the cylindrical core 1 when in the clamped state, to charge the cavity with a molding material to be shaped. A seal ring 16 is mounted in the fitting hole portion 14 of the upper insert die 12 to fit the outer circumference of the upper end portion of the cylindrical core 1 while holding a slight air ventilation. The upper mold 10 is provided with an injection hole 33 for the molding material and a relief hole 35 for the air and the molding material.

11 Claims, 8 Drawing Sheets

MOLDING TOOL FOR MOLDING WITH CYLINDRICAL CORE

BACKGROUND OF THE INVENTION

1. Technical Field

The present invention relates to such a molding tool for a molding with a cylindrical core as is employed mainly as a vibration absorbing rubber bushing or a vibration absorbing mount for vehicles.

2. Background Art

As the vibration absorbing rubber bushing or the vibration absorbing mount for vehicles, there is known a cylindrical type in which an elastic rubber member is placed between a cylindrical core as an inner cylinder and an outer cylinder member or in which the elastic rubber member is arranged around the cylindrical core by omitting the outer cylinder member.

The molding tool for the molding with the cylindrical core such as that cylindrical vibration absorbing rubber bushing is generally constructed such that insert dies confronting each other vertically to mold the axial side faces of a molding are arranged in a cavity forming portion of upper and lower molds to be clamped, such that support pins are disposed at the central portion of at least one insert die or both the insert dies of the upper and lower molds thereby to support the cylindrical core upright by fitting the end portions of the cylindrical core on the support pins and by retaining the two ends of the same, and such that a cavity is formed around the cylindrical core when the upper and lower molds are clamped, so that a molding material such as rubber may be shaped by injecting and charging it into the cavity (as disclosed in Japanese Utility Model Publication No. 28020/1993 or in Japanese Patent Laid-open No. 276382/1995).

Here, the portions, as vertically protruding from the cavity, of the supported cylindrical core are fitted in the fitting hole portions formed in the central portions of the upper and lower insert dies so that their upper and lower ends are retained in retaining step portions of the support pins. However, the molding material, as injected into the cavity, will flow through the spacings between the end portions of the cylindrical core and the surrounding inner circumferences of the fitting hole portions so far that it enters the small spacings between the end faces of the cylindrical core and the retaining step portions thereby to cause the end face burrs.

If the end portions of the cylindrical core are so snugly fitted in the inner circumferences of the fitting hole portions as to reduce the spacings substantially to zero, however, the cylindrical core cannot be easily removed at the parting time after the molding operation, thereby to deteriorate the workability. If the cylindrical core is held in a completely fitted state, moreover, the air may not be completely discharged from the cavity. Especially when the air resides in the vicinity of the upper end portion, voids are left in the molding to make the molding defective.

In Japanese Patent Laid-Open No. 276382/1995, therefore, it has been proposed to dispose such a bushing in the inner circumference of the fitting hole portion of the insert die as can fit the predetermined size of the inner circumference of the end portion of the cylindrical core tightly, thereby to fit and support the end portion at the bushing.

Since the proposed bushing has the tightly or snugly fitting structure, however, there is required special means for releasing that tightness, e.g., knock-out means such as a spring or a push rod when the molds are to be opened. In addition, where the upper end portion of the cylindrical core is snugly fitted at the bushing especially in the fitting hole portion of the upper insert die, the highest portion of the cavity reserves the air, which is not completely discharged even by injecting and charging the molding material, so that the residual air makes the defect. This air defect can be normally eliminated if the air leaves the mating portions of the individual molds, but these mold mating portions may form the burrs.

If the charging pressure of the molding material to be injected and charged into the cavity is lowered, on the other hand, the burr is reduced, but the molding tends to be defected by the internally left air. Therefore, the injecting and charging pressure is so set as to cause the aforementioned problems as few as possible. However, the defect due to the residual air or the burr is not completely eliminated.

Where a plurality of cavity forming assemblies are provided in the molding tool provided with an injection apparatus for one molding material, on the other hand, the injecting and charging pressures into the cavities in the individual cavity forming assemblies are required to be constant for homogenizing the moldings.

In view of the description thus far made, the invention contemplates to provide a molding tool which is enabled to discharge the air reliably from the vicinity of the upper end portion of a cylindrical core and to eliminate the end face burrs. The invention further contemplates to provide a molding tool for a molding with a cylindrical core, in which the pressures for injecting and charging the molding material into individual cavities are held constant where a number of cavity forming assemblies are arranged.

SUMMARY OF THE INVENTION

According to an aspect of the invention, there is provided a molding tool for a molding with a cylindrical core, comprising: an upper mold and a lower mold adapted to be clamped directly or through an intermediate mold and including insert dies confronting each other vertically for forming the axial side faces of a molding with a cylindrical core, the inert dies of said upper and lower molds being individually provided with fitting hole portions for supporting the end portions of the cylindrical core set therein, said lower die being provided at its fitting hole portion with a support pin fitted in said cylindrical core from the lower end opening for retaining the lower end of said cylindrical core, said upper die being provided at its fitting hole portion with a core holder confronting said support pin concentrically and fitted on the upper end of said cylindrical core, said upper and lower molds being clamped to form a cavity around the outer circumference of said cylindrical core supported by said support pin and said core holder, and a molding material such as rubber being charged into said cavity so that it may be molded integrally with said cylindrical core. As the means for solving the aforementioned problems, the molding tool is characterized by comprising: a seal ring mounted in the fitting hole portion of the insert die on the side of said upper mold for fitting the outer circumference of the upper end portion of said cylindrical core while holding a slight air ventilation; a molding material injection hole leading from the upper face of said upper mold to said cavity; and an air and molding material relief hole leading from said cavity to the upper face of said upper mold.

According to this molding tool, when the molds are clamped by supporting the cylindrical core, the molding material such as rubber, as injected from the injection hole into the cavity, is charged around the cylindrical core from the lower portion to push the internal air upward and expel it through the relief hole, and the excessive molding material is also charged to the relief hole so that the air residing in the molding material is also simultaneously discharged.

On the other hand, the air, as might otherwise be reserved in the vicinity of the upper end portion of the cylindrical core, is discharged by charging the molding material from the small spacing between the cylindrical core and the seal ring which is fitted on the outer circumference of the upper end portion of the cylindrical core, so that it is hardly left.

If the vulcanization is performed in this state, moreover, the charging pressure of the molding material in the cavity does not rise excessively high so that no extrusion of the molding material occurs from the small spacing between the seal ring and the end portion of the cylindrical core thereby to prevent formation of the burrs.

In the aforementioned molding tool, said molding material injection hole and said relief hole in said upper mold are preferably disposed at positions of 180 degrees with respect to each other across the axis of said cavity. As a result, the molding material, as injected from the injection hole, flows around the two sides of the cylindrical core and fills up the entire cavity, and a portion of the molding material can be so released from the relief hole at the position opposed to the injection hole as to expel the air thereby to improve the air discharge.

The aforementioned molding tool is preferred to further comprise a core receiving seal member mounted in the fitting core portion of the insert die on the side of said lower mold for fitting the lower end portion of said cylindrical core while holding a slight air ventilation. As a result, the burrs can be satisfactorily prevented from being formed even at the lower end portion of the cylindrical core.

On the other hand, the aforementioned molding tool is preferred to further comprise a runner plate placed separably over the upper face of said upper mold and including a molding material injecting runner groove and an air and molding material relief groove formed in the lower face of said runner plate and connected individually with said injection hole or said relief hole in said upper mold. As a result, it is possible to perform smoothly and satisfactorily the action to inject and charge the molding material and the action of releasing the excessive molding material and the air.

In the aforementioned molding tool, moreover, said support pin can be arranged to move axially upward and to be supported at a fixed position by being biased downward by a return spring, furthermore to be pushed up at a parting time against the biasing force of said return spring with suitable push-up means. By this pushing-up action, the lower end portion of the cylindrical core can be easily separated from the fitting portion of the seal member thereby to separate the molds easily.

On the other hand, said core holder can be supported to move axially within a predetermined size range so that it can be biased axially downward by spring means to hold the cylindrical core by the biasing force of said spring means in a mold closing state supporting the cylindrical core and so that it can be moved axially downward by opening the molds to separate the upper end portion of the cylindrical core from the fitting portion of the seal ring. It means that the cylindrical core can be stably held, even if it has an error in the axial size, by the biasing force of the spring means. Moreover, the core holder is moved axially downward by the biasing force of the spring means as the molds are opened after the molding operation, thus the upper end portion of the cylindrical core is naturally separated from the fitting portion of the seal ring. As a result, the molding can be left on the lower side so that it can be easily parted.

In the aforementioned molding tool, a plurality of cavity forming assemblies including the insert dies confronting each other vertically, the support pin and and core holder are suitably arranged in said upper and lower molds, and the injection holes for injecting the molding material into the cavities of the individual cavity forming assemblies are suitably arranged equidistantly from the injection port of an injection apparatus. As a result, although the molding material is injected and charged into the numerous cavities from the injection port of one injection apparatus, the injection distances to the individual cavities can be equalized to homogenize the injection rates and the injection and charging pressures.

On the other hand, said cavity forming assemblies are preferably arranged on a common circle around the injection port of the injection apparatus, and the injection holes of the individual cavity forming assemblies are preferably arranged on a common circle and equidistantly from said injection port. As a result, the injection distances from the injection port to the individual cavities can be easily adjusted.

In the aforementioned molding tool, the relief holes of the individual cavity forming assemblies are preferably connected by the relief grooves of said runner plate so that they have communication with the outside of the mold side. As a result, the excessive molding material portions from the relief holes to the relief grooves can be so continuous as to facilitate their removing works after the molding operation.

In the aforementioned molding tool, on the other hand, the relief grooves of said runner plate preferably form a circle around the injection port of the injection apparatus and are preferably provided at the upper ends of the individual relief holes with projection forming portions for forming small protrusions. As a result, the excessive portions, as molded in the individual relief holes, can be extracted and removed without difficulty from the relief holes.

In the aforementioned molding tool, moreover, the injection holes and the relief holes of the individual cavity forming assemblies are formed around the injection port of said injection apparatus and on radial lines extending through the axes of said cavity forming assemblies. Then, the flow of the molding material from the charge to the relief holes can be smoothened to ensure the charging of the molding material and the discharging of the air thereby to reduce the defective moldings.

DESCRIPTION OF THE PREFERRED EMBODIMENT

A preferred embodiment of a molding tool according to the invention will be described with reference to the accompanying drawings. However, the invention should not be limited to the embodiment.

Figure 3:
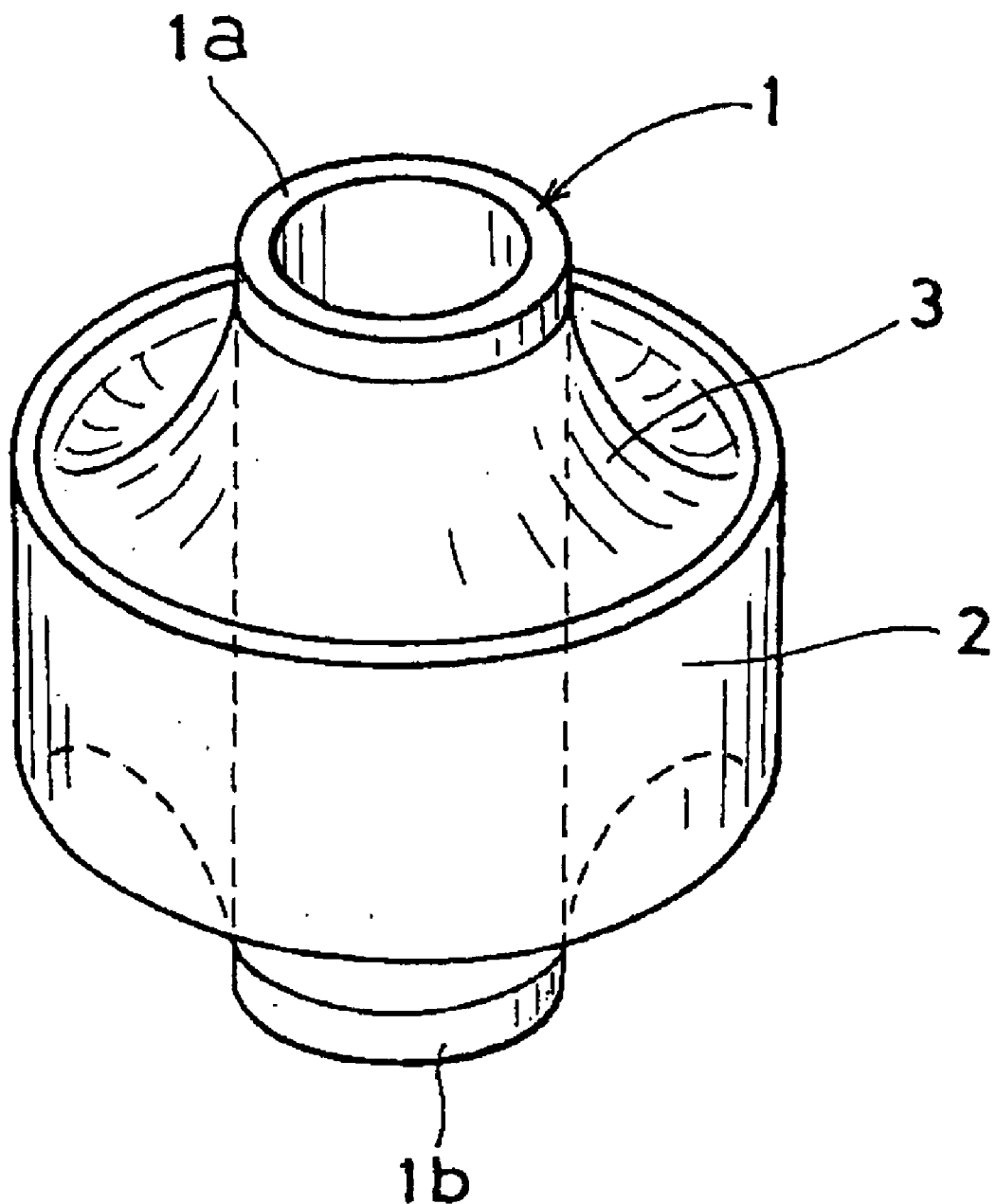
FIG. 3 is a perspective view showing one example of a molding with a cylindrical core.

A molding (A) with a cylindrical core is constructed, as shown in FIG. 3, by placing an elastic rubber member (3) between a cylindrical core (1) and an outer cylinder member (2). The elastic rubber member (3) is adhered to both of the cylindrical core (1) and the outer cylinder member (2) by vulcanization. Normally, the cylindrical core (1) is made longer than the outer cylinder member (2) to protrude at its two ends from the two axial side faces of the elastic rubber member (3).

Figure 1:
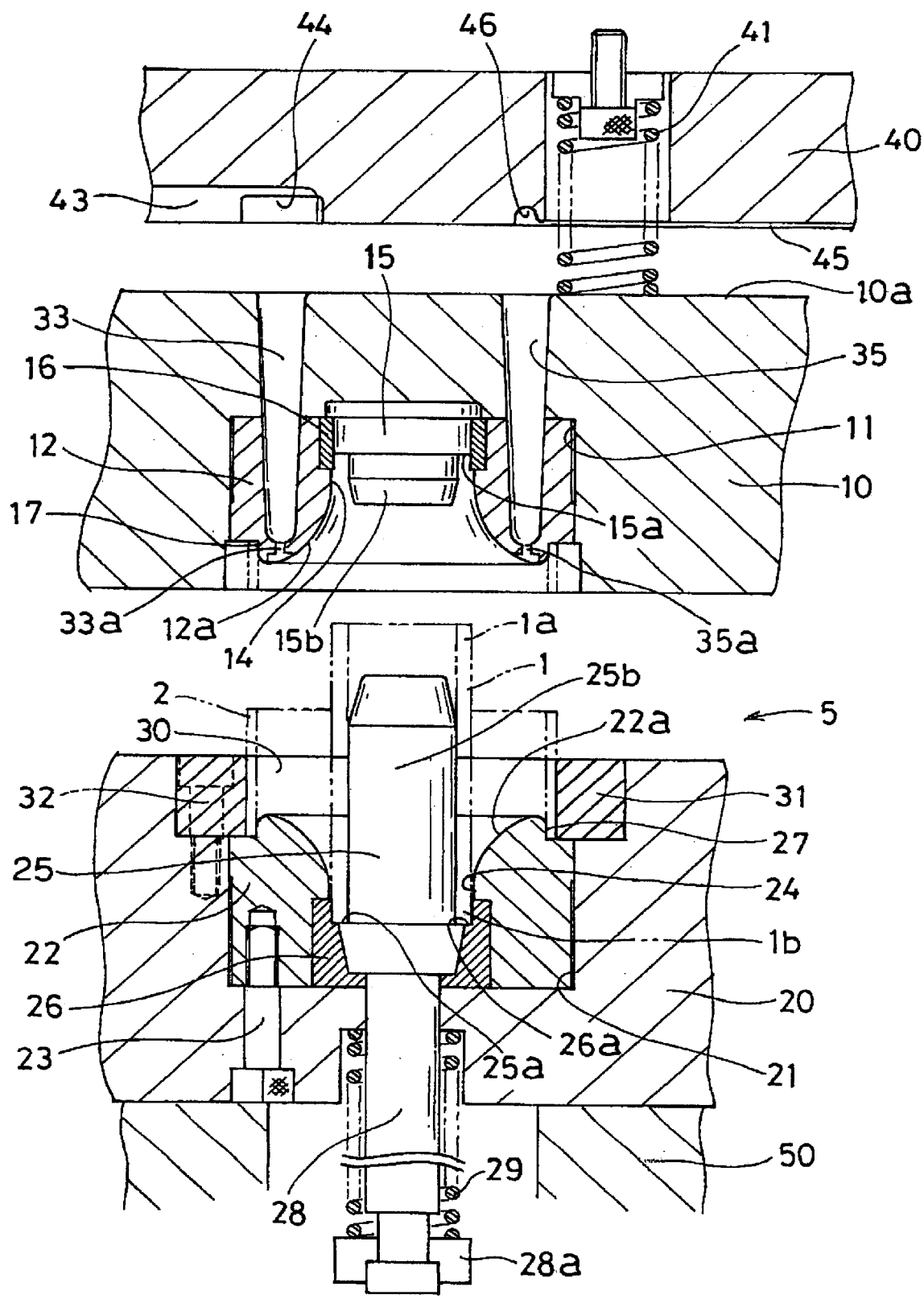
FIG. 1 is a longitudinal section schematically showing one cavity forming portion of a molding tool as an embodiment of the invention.
Figure 2:
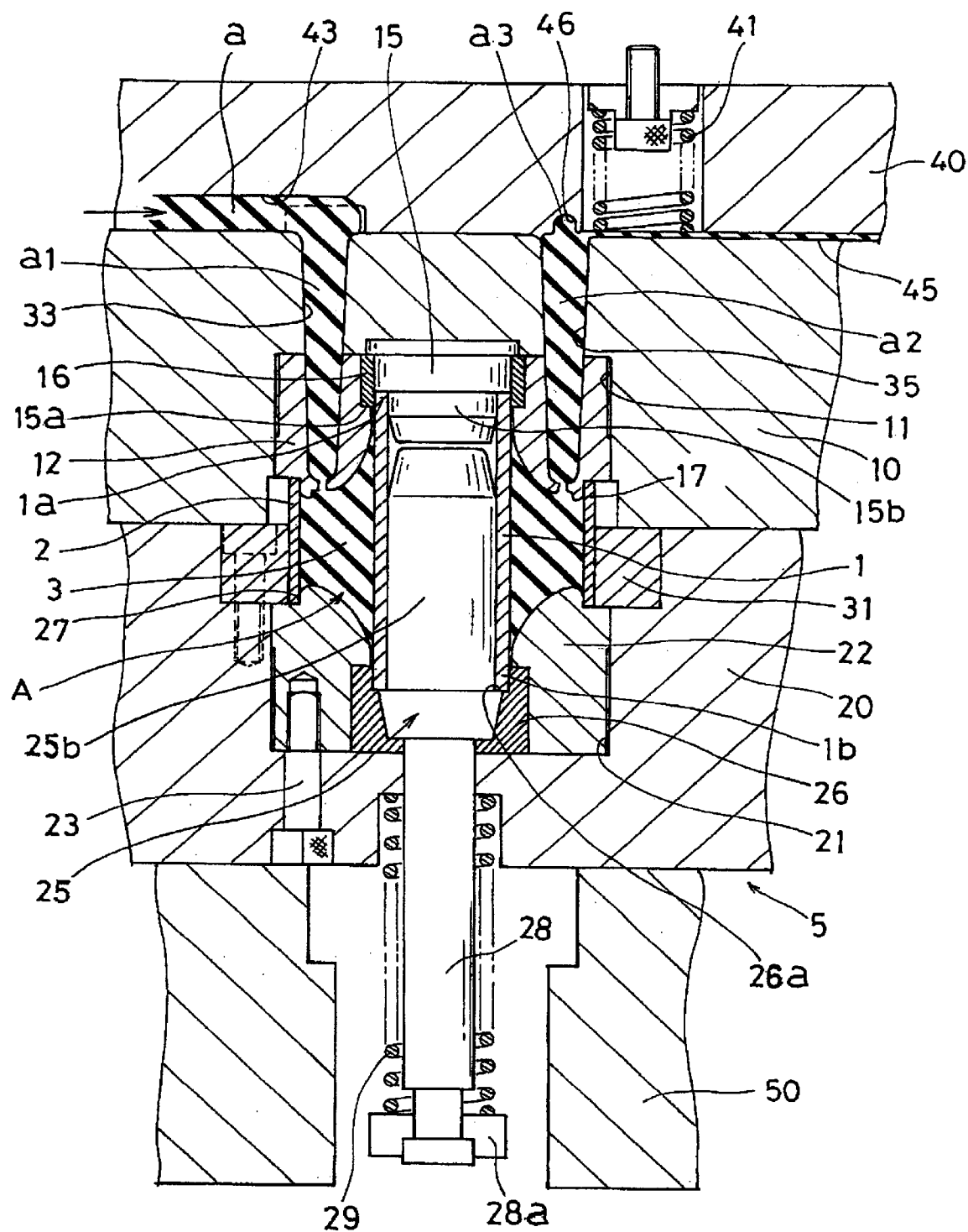
FIG. 2 is a longitudinal section showing the molding state of the same.

The molding tool according to the invention is used to mold the molding (A) with the cylindrical core and is provided with a cavity forming assembly (5), as shown in FIGS. 1 and 2, to have the following construction.

In FIGS. 1 and 2, numerals (10) and (20) designate an upper mold and a lower mold, respectively, which can be clamped. The upper mold (10) and the lower mold (20) are provided in its lower and upper portions with cavity forming recesses (11) and (21), respectively. In these recesses (11) and (21), respectively, there are fitted and fixed insert dies (12) and (22) which confront each other to form the axial side faces of the molding (A) with the cylindrical core. Numeral (23) designates fixing screws for fixing the lower insert die (22). The upper insert die (12) is likewise fixed by the (not-shown) fixing screws. Numeral (50) designates a base plate for bearing and supporting the lower mold (20).

The insert dies (12) and (22) of the upper and lower molds (10) and (20) are provided at their central portions with fitting hole portions (14) and (24) for supporting the upper and lower end portions (1a) and (1b), as set in the molds, of the cylindrical core (1). Those fitting hole portions (14) and (24) are formed continuously from shaping face portions (12a) and (22a) for forming the axial side face of the molding (A), in predetermined curved faces corresponding to the molding shape.

The fitting hole portion (24) on the side of the lower mold (20) is provided at its central portion with a support pin (25) which is protruded so upright as is fitted in the lower end opening of the cylindrical core (1) to retain the lower end. Numeral (25a) designates a step portion which is formed on the root portion of a fitted pin portion (25b) for retaining the lower end.

On the other hand, the upper mold (10) is provided in its fitting hole portion (14) with a core holder (15) which is retained on the upper end of the cylindrical core (1) while vertically confronting the support pin (25) concentrically. Numeral (15a) designates a step portion for retaining the upper end. As shown, the core holder (15) is provided with a rather short fitted pin portion (15b) which is to be set in the mold and fitted in the upper end portion of the cylindrical core (1).

With the upper and lower molds (10) and (20) being clamped, therefore, a cavity (30) can be formed around the outer circumference of the cylindrical core (1) which is retained and supported by the support pin (25) and the core holder (15).

In the inner circumference of the fitting hole portion (14) of the upper insert die (12), moreover, there is mounted a seal ring (16), which is made of a rigid material such as a metal and fitted in the deep portion of the fitting hole portion (14), with such a small clearance from the outer circumference of the upper end portion of the cylindrical core (1) as can suppress leakage of the molding material while allowing a proper air ventilation.

In other words, the seal ring (16) has its internal diameter size set according to the external diameter of the end portion of the cylindrical core (1) so that the outer circumference of the upper end portion of the cylindrical core (1) may be able to hold the fitted state, in which it can block the leakage of the molding material while keeping the proper air ventilation capable of discharging the air at the molding time but does not make an obstruction to the parting action of the mold. The internal diameter of the seal ring (16) is set according to the external diameter of the end portion of the cylindrical core (1). Since the cylindrical core (1) is provided on its surface with an adhesive layer, for example, the internal diameter of the seal ring (16) is made slightly larger than the external diameter of the cylindrical core (1) by considering the thickness of that adhesive layer. The clearance between the inner circumference of the seal ring (16) and the outer circumference of the cylindrical core (1) is preferably with a size range as small as 0.1 mm or less.

On the inner circumference of the inside deep portion of the fitting hole portion (24) of the lower insert die (22), on the other hand, there is mounted a core receiving ring-shaped seal member (26) made of a rigid member, in which the outer circumference of the lower end portion of the cylindrical core (1) is fitted while keeping a slight air ventilation. For this seal member (26), too, the internal diameter size or the like of the fitting portion is set as in the case of the seal ring (16). In the shown case, the seal member (26) is provided at the lower end of its fitting portion with a retaining step portion (26a) having a height equal to that of the step portion (25a) so that the lower end of the cylindrical core (1) can be retained by the two step portions (25a) and (26a). The root portion of the support pin (25) is fitted and supported at its portion lower than the step portion (26a).

The upper and lower insert dies (12) and (22) are provided in their outer circumferential portions with fitting step portions (17) and (27) for holding the outer cylinder member (2) of the molding (A) with the cylindrical core concentrically with the cylindrical core (1). With the upper and lower molds (10) and (20) being clamped, as shown in FIG. 2, the fitting step portions (17) and (27) can fit and hold the outer cylinder member (2) while clamping the upper and lower end faces of the outer cylinder member (2) vertically. When a molding without the outer cylinder member (2) is to be formed, the inner side faces of the recesses (11) and (21) are formed to shape the outer circumference of the molding.

Numeral (31) designates a holding ring for the lower insert die (22). This holding ring (31) is fixed in the lower mold (20) by means of fixing screws (32) such as bolts so that the outer cylinder member (2) to be set is fitted in the inner circumference of the holding ring (31), as has been described hereinbefore. As a result, the holding ring (31) prevents the outer cylinder member (2) from being bulged and deformed at the molding time.

The aforementioned support pin (25) can move axially upward, and an eject pin (28) is connected to the lower end of the support pin (25). Between a spring seat (28a) at the lower end portion of the eject pin (28) and the lower mold (20), there is mounted a return spring (29) for biasing the support pin (25) downward and retaining it at a fixed position (i.e., the position of FIG. 2). At the parting time after the molding operation, the eject pin (28) is pushed up with the (not-shown) suitable push-up means against the biasing force of the return spring (29) so that the lower end portion (1b) of the cylindrical core (1) of the molding (A) can be separated from the fitting portion of the seal member (26).

The upper core holder (15) is preferably constructed, as will be described in connection with an embodiment of FIGS. 6 and 7, such that it is supported to move axially within a predetermined size range and such that it is so biased axially downward by making use of spring means as to separate the upper end portion (1a) of the cylindrical core (1) of the molding (A) from the seal ring (16) at the parting time after the molding operation.

Numeral (33) designates an injection hole which extends from the upper face (10a) of the upper mold (10) to the cavity (30) for injecting a molding material (a) such as rubber. Numeral (35) designates a relief hole which extends from the cavity (30) to the upper face (10a) of the upper mold (10) for relieving the air and the molding material (a). The relief hole (35) is vertically extended through the upper mold (10) and the insert die (12). These injection hole (33) and relief hole (35) in the embodiment are desirably formed generally at positions of 180 degrees with respect to each other across the axis of the cavity (30), as shown, although they may be formed at any positions over the cavity (30).

Both the injection hole (33) and the relief hole (35) are so tapered as to have the larger diameters toward the side of the upper face (10a) and are provided with gates (33a) and (35a) which are formed in constricted shapes in the vicinity of the openings on the side of the cavity (30), so that the molding (A) can be parted at the portions of the gates (33a) and (35a) from unnecessary portions (a1) and (a2) at the parting time after the molding operation.

Numeral (40) designates a runner plate which is separably laid over the upper face (10a) of the upper mold (10). Simultaneously as the upper and lower molds (10) and (20) are opened, the runner plate (40) can be parted from the upper mold (10). Numeral (41) designates a separating spring for the runner plate (40).

In the lower face of the runner plate (40), there are so formed a runner groove (43) for injecting the molding material such as rubber and a relief groove (45) for the molding material as are individually connected with the injection hole (33) or the relief hole (35) when the runner plate (40) closes the upper face of the upper mold (10). The runner groove (43) is connected with the injection port of an injection apparatus, and the relief groove (45) is opened to the mold side face. Numeral (44) designates a joint end portion to the injection hole (33) of the runner groove (43). This joint end portion (44) has a circular shape of a rather larger diameter than that of the opening of the injection hole (33). Numeral (46) designates a protrusion forming portion which is formed at the joint portion of the relief groove (45) to the relief hole (35), for forming a small protrusion (a3) at the upper end of the unnecessary portion (a2) of the molding material in the relief hole (35).

The molding tool is normally practiced by arranging a plurality of cavity forming assemblies (5) thus constructed, i.e., a plurality of cavity forming assemblies (5) each having the upper and lower molds (10) and (20), which are provided with the insert dies (12) and (22) confronting each other, the support pin (25), the core holder (15) and so on. In this case, the runner grooves (43) from the injection port (6) of the injection apparatus to the molding material injection holes (33) leading to the cavities (30) of the individual cavity forming assemblies (5) are especially preferably arranged to have equal distances for homogenizing both the amounts of molding material to the individual cavities (30) and the injecting and charging pressures.

Figure 4:
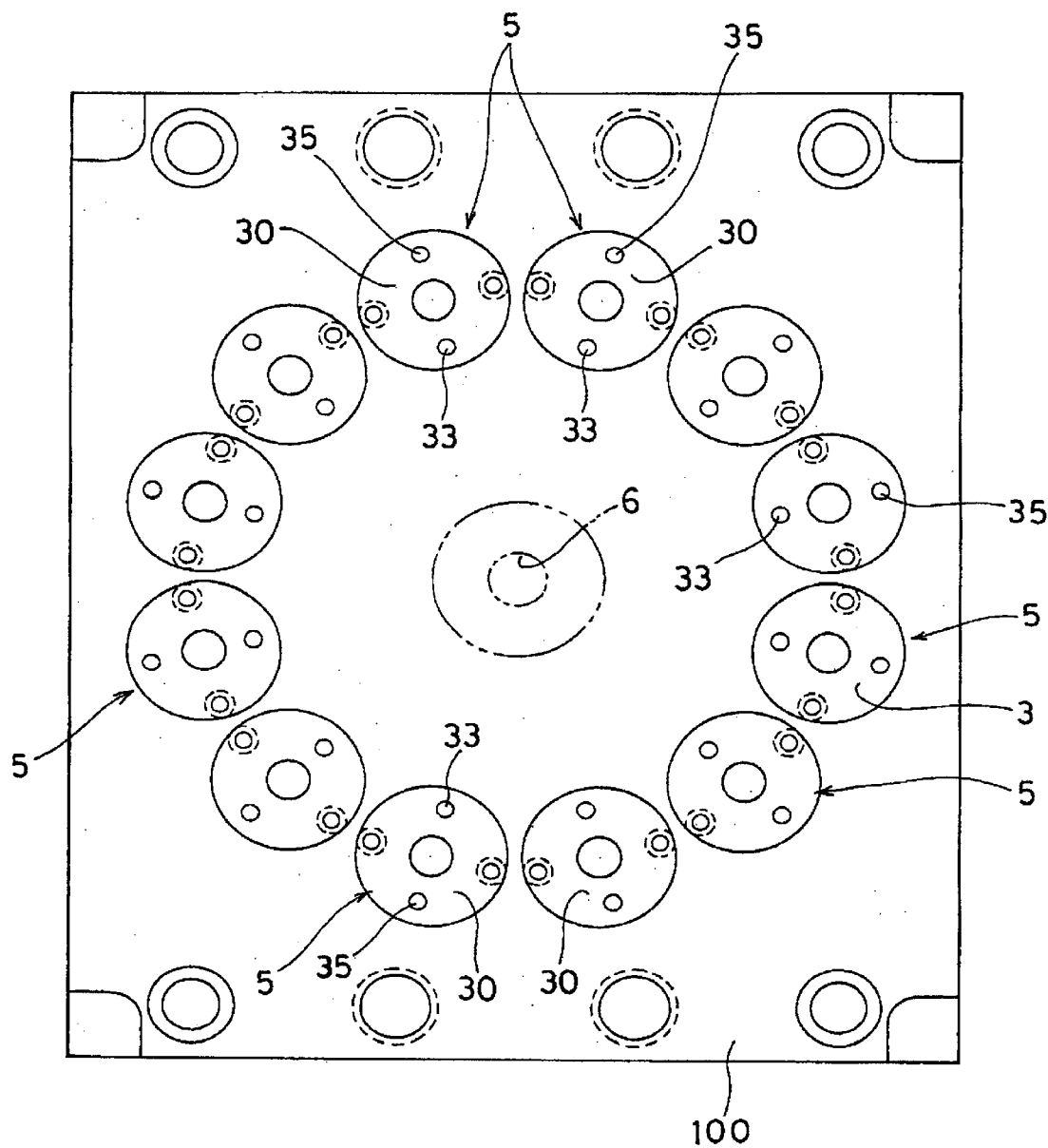
FIG. 4 is a schematic top plan view for explaining an arranged state of the cavity forming portion in the upper mold of the entire molding tool.
Figure 5:
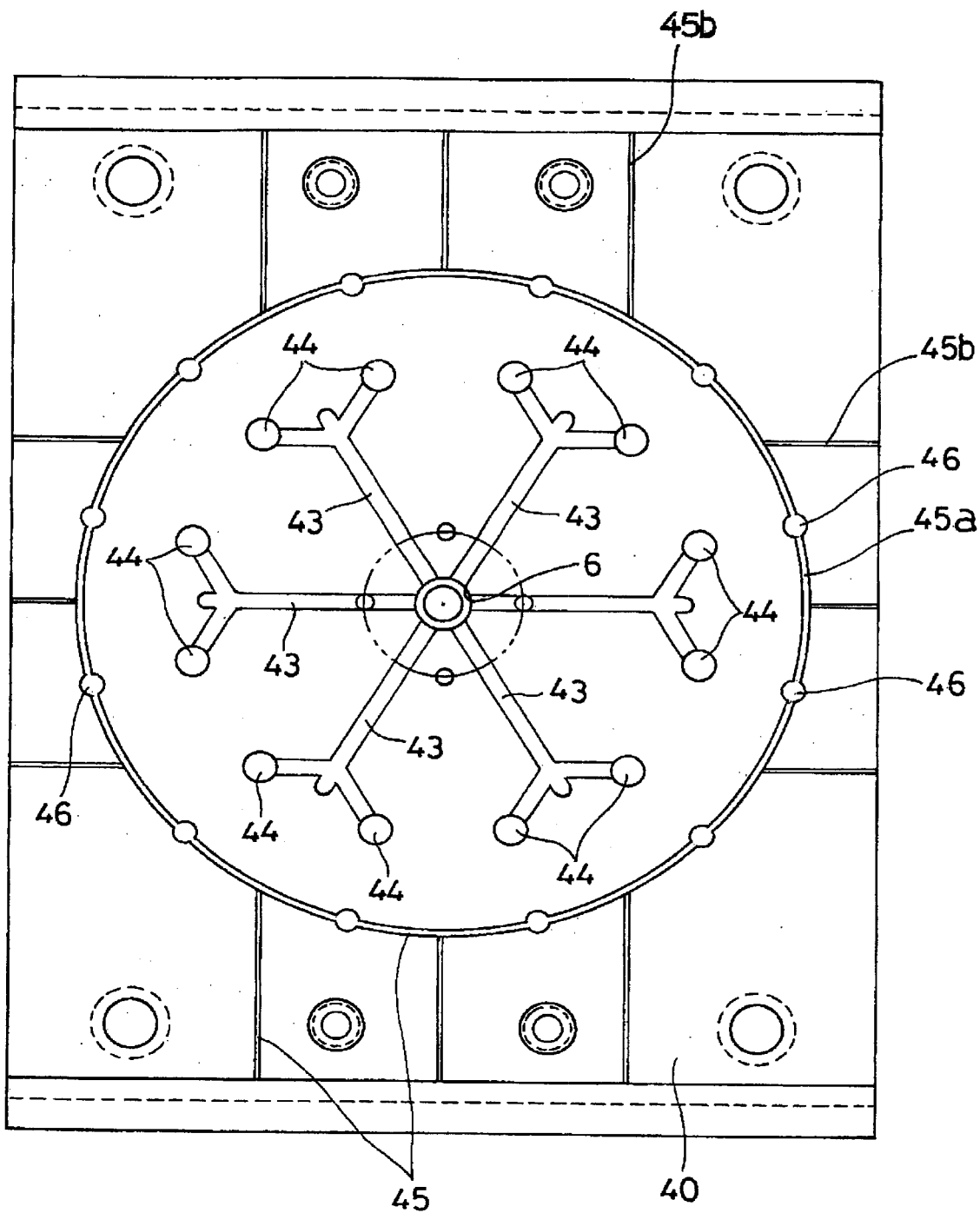
FIG. 5 is a schematic top plan view for explaining the lower face shape of a runner plate to be placed on the molding tool of FIG. 4.

As shown in FIGS. 4 and 5, for example, it is advisable that an even number of cavity forming assemblies (5) are equidistantly arranged on a common circle around the injection port (6) of the injection apparatus, and that the injection holes (33) and the relief holes (35) are also individually arranged on a common circle around the injection port (6). It is practically preferable that those injection holes (33) and relief holes (35) are arranged on the radial lines extending from the injection port (6) through the axes of the cavity forming assemblies (5). Moreover, the runner grooves (43) and the relief grooves (45) are preferably provided to connect those injection holes (33) and the relief holes (35).

For the runner grooves (43), more specifically, the two adjoining cavity forming assemblies (5) are made into one set, for which there is formed one runner groove extending radially from the injection port (6). This running groove is bifurcated at its end portion into two branches which are connected with the injection holes (33) and (33) of the two cavity forming assemblies (5) and (5) so that the distances from the injection port (6) to the individual injection holes (33) may be equalized.

On the other hand, the relief grooves (45) are also formed in a circular shape around the injection port (6) so that the individual relief holes (35) may be connected at the circular portion (45a) and may be further connected to the outside through groove portions (45b) extending to the outside from the circular portion (45a). In this case, too, at the individual intersections of the circular portion (45a) with the relief holes (35), there may be formed the protrusion forming portions (46) for forming the small protrusions (a3) at the upper ends of the relief holes (35).

Here in the molding tool thus far described, the opening and closing means and the drive means for the upper and lower molds (10) and (20), the opening and closing means for the runner plate (40), the guide means for the opening and closing actions, and so on can be exemplified by those well-known in this kind of molding tool, so that their detailed descriptions will be omitted. Although not shown, however, the invention may be practiced such that the upper and lower molds (10) and (20) can be clamped through an intermediate mold.

Here will be described the working operation for manufacturing the molding (A) with the cylindrical core, as shown in FIG. 3, by using the molding tool having the construction of the embodiment thus far described.

First of all, in the open state where the upper mold (10) is apart from the lower mold (20), there are set (as shown by chain lines in FIG. 1) the cylindrical core (1) and the outer cylinder member (2). Specifically, the cylindrical core (1) is fitted on the support pin (25) provided in the insert die (22) on the side of the lower mold (20), and its lower end portion (1a) is fitted in the fitting hole portion (24) so that the cylindrical core (1) is supported in the upright position by retaining its lower end on the retaining step portion (25a).

On the other hand, the outer cylinder member (2) is fitted and set on the fitting step portion (27) at the outer circumferential portion of the insert die (22).

Next, when the upper mold (10) is made come down, thereby closing the upper and lower molds (10) and (20), the fitting hole portion (14) of the insert die (12) present in the upper mold (10) is fitted in the upper end portion (1a) of the of the cylindrical core (1), whereby not only the seal ring (16) present in the inner circumference thereof is fitted in the outer circumference of the upper end portion (1a), but also the step portion (15a) of the core holder (15) is retained in the upper end to press the cylindrical core (1). At the same time, the fitting step portion (17) in the outer circumference of the insert die (12) is fitted in the upper end portion of the outer cylinder member (2).

Accordingly, in the closing state of the upper and lower molds (10) and (20), the cylindrical core (1) set in the inner portion is supported by the lower-side support pin (25) as well as vertically supported upon being pressed by the upper-side core holder (15). At the same time, the outer circumference of the upper end portion (1a) of the cylindrical core (1) is fitted in the seal ring (16) in the inner circumference of the fitting hole portion (14) and kept there. As shown in the drawing, in the case where the seal member (26) is present in the inner circumference of the fitting hole portion (24), the lower end portion (1b) of the cylindrical core (1) is kept in a state where it is fitted in the seal member (26). Similarly, the outer cylinder member (2) is placed in the fitting state between the fitting step portions (17) and (27) of the upper and lower insert dies (12) and (22) and kept there. Thus, the cavity (30) is formed in the circumference of the cylindrical core (1), enclosed by the outer cylinder member (2), the upper insert die (12) and the lower insert die (22).

Then, a predetermined amount of the molding material (a) injected for molding from the injection port (6) of the injection apparatus is injected and charged in the cavity (30) under a predetermined pressure through the runner groove (43) of the runner plate (40) and the injection hole (33) of the upper mold (10). At this time, when, as shown in FIGS. 4 and 5, the molding tool is equipped with a plurality of the cavity forming assemblies (5), and the respective injection holes (33) are set with equal distances from the injection ports (6), the injection amount and the injection charge pressure of the molding material (a) in each of the cavity forming assemblies (5) become equal.

In the cavity forming assembly (5), moreover, the molding material (a), as injected from the injection hole (33) into the cavity (30), flows from the injection hole (33) around the both sides of the cylindrical core (1) to the confronting relief hole (35) so that it is charged into the cavity (30) while discharging the air from the relief hole (35). After the cavity (30) is fully charged up with the molding material (a), on the other hand, the excessive molding material is discharged from the relief hole (35). At this time, the air residing in the cavity (30) is also discharged by being trapped in the molding material (a).

Especially where the injection hole (33) and the relief hole (35) of each of the individual cavity forming assemblies (5) are disposed at 180 degrees with respect to each other on the radial line extending from the injection port (6), the flow of the molding material (a) from the injection hole (33) to the relief hole (35) is smoothed to ensure the charge of the molding material (a) and the discharge of the air.

Thus, the vulcanizing molding operation is performed under a predetermined charging pressure. At this time, the upper end portion (1a) of the cylindrical core (1) is fitted at its outer circumference in the inner circumference of the seal ring (16) of the upper fitting hole portion (14). This seal ring (16) and the outer circumference of the upper end portion (1a) are fitted to hold such a small clearance as to regulate the leakage of the molding material while keeping the air ventilation. As a result, the air residing in the spacing between the cylindrical core (1) at the upper position in the cavity (30) and the fitting hole portion (14) is discharged from the clearance between the seal ring (16) and the upper end portion (1a). Therefore, little defective molding is made by the reserved air.

Because of the extremely small clearance between the seal ring (16) and the upper end portion (1a) of the cylindrical core (1), moreover, the molding material (a), as having entered the spacing between the cylindrical core (1) and the fitting hole portions (14) and (24), will not leak out of the clearance between the seal ring (16) and the cylindrical core (1) so that the molding can be prevented from being burred.

A similar discussion can also apply to the fitted portion between the seal member (26) of the fitting hole portion (24) on the lower side and the lower end portion (1b) of the cylindrical core (1), to prevent the burr, as might otherwise be caused by the leakage of the molding material (a).

After the molding operation, the upper and lower molds (1) and (20) are opened, and the runner plate (40) is separated from the upper face (1a) of the upper mold (10), and the molding (A) with the cylindrical core is extracted. At this time, the elastic rubber member (3) of the molding (A) is cut away from the unnecessary portions in the injection holes (33) and in the relief holes (35) at the gates (33a) and (35a) respectively, and the molding (A) is extracted from the molds.

At the parting time of this molding (A), the lower end portion (1b) of the cylindrical core (1) can be easily separated from the fitting portion of the seal member (26) by pushing up the lower support pin (25) with the eject pin (28).

The unnecessary portion (a1) left in the injection hole (33) is extracted together with the unnecessary portion left in the runner groove (43), and the unnecessary portion (a2) left in the relief hole (35) is pulled out by pinching out the small protrusion (a3) at its upper end. Moreover, the unnecessary portions in the relief grooves (45) are further removed. At this time, the aforementioned removing works can be easily performed if the plurality of relief holes (35) are continuous through the relief grooves (45), as in the shown embodiment.

Figure 6:
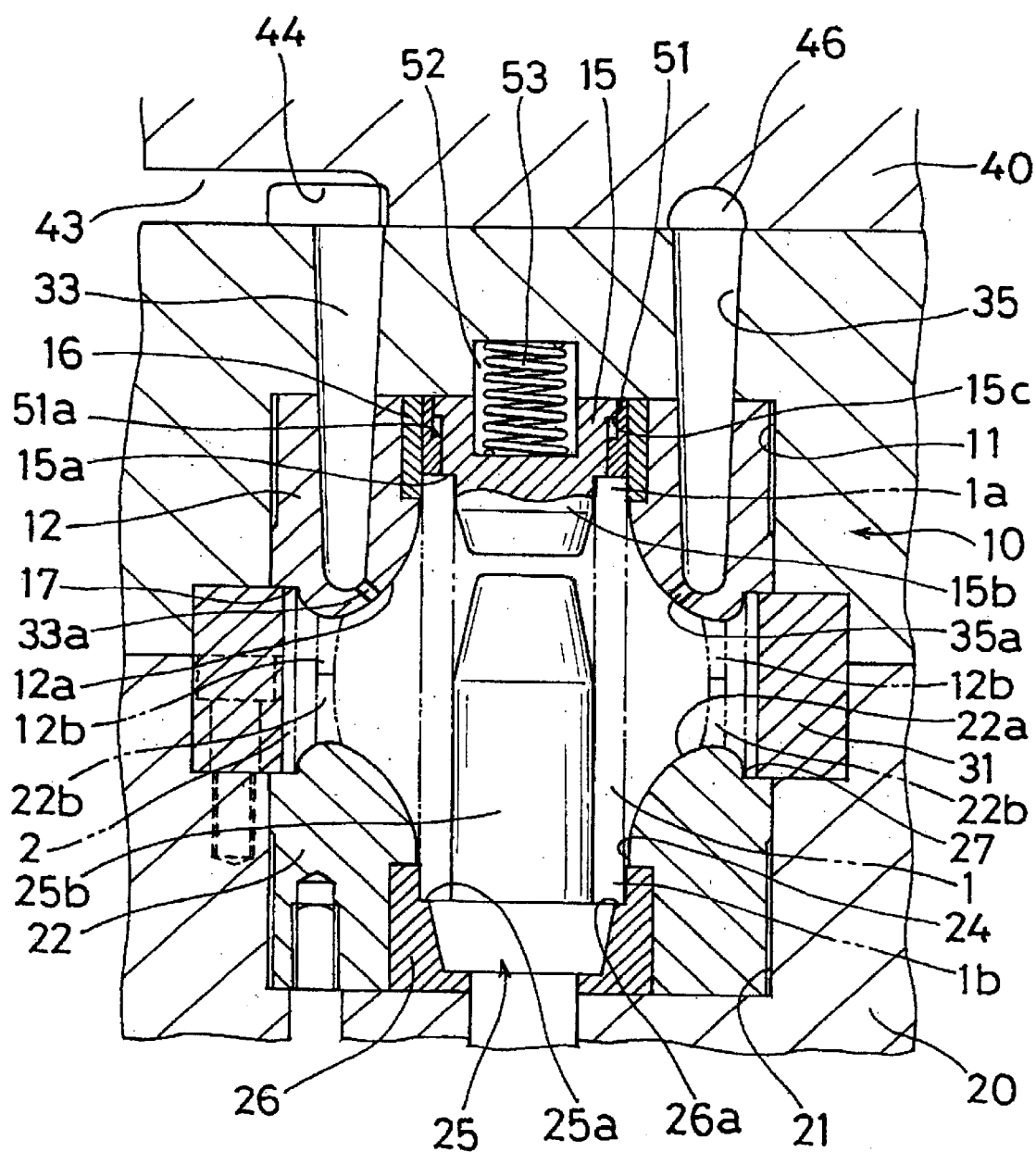
FIG. 6 is a longitudinal section of the mold-closed state and shows one cavity forming portion in the molds schematically according to another embodiment of the invention.
Figure 7:
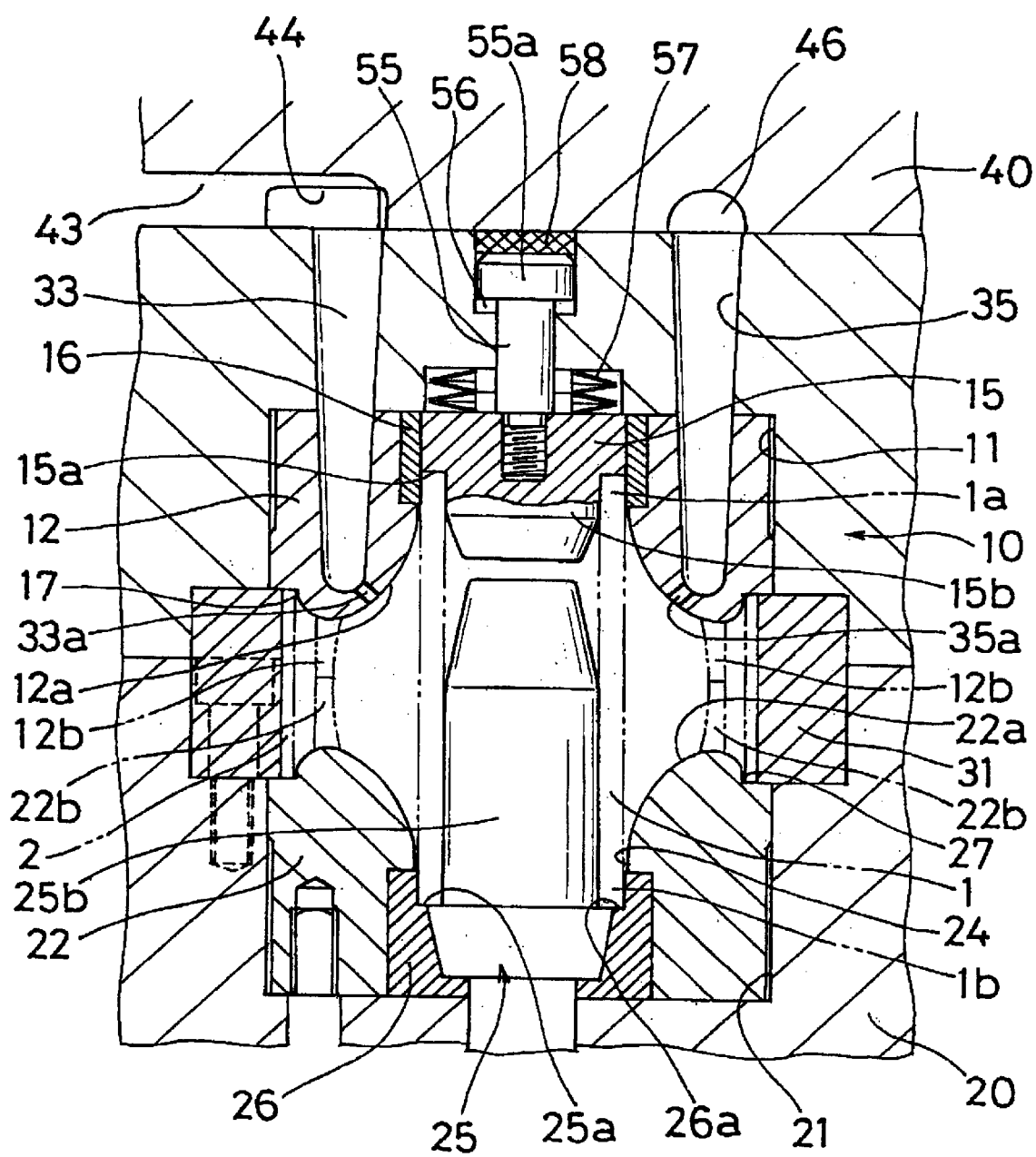
FIG. 7 is a longitudinal section of the mold-closed state and shows one cavity forming portion in the molds schematically according to still another embodiment of the invention.

FIGS. 6 and 7 show individual other embodiments of a mold according to the invention for making the molding (A) with the cylindrical core like the foregoing embodiment. In these embodiments, especially the upper core holder (15) utilizes spring means for separating the molding (A) easily at the parting time. Here in these embodiments, the detailed description of the same components or members as those of the foregoing embodiment will be omitted by designating them using the common reference numerals.

In the case of the embodiment of FIG. 6, the upper core holder (15) is so fitted in a holding cylinder (51) fixed in the inner circumference of the seal ring (16) as can slide in the axial direction (namely, in the vertical direction). Specifically, the upper core holder (15) can move vertically within a predetermined size range, that is, between a position (as shown in FIG. 6), at which a diametrically enlarged step portion (15c) at the upper portion of the outer circumference of the core holder (15) is spaced from the diametrically smaller step portion (51a) belonging to the lower portion of the inner circumference of the holding cylinder (51), and a position at which the step portion (15c) engages with the step portion (51a). In a housing portion (52) formed between the core holder (15) and the upper mold (10), moreover, there is housed in a compressed state a coil spring (53) which acts as the spring means for biasing the core holder (15) downward.

In the mold closing state supporting the cylindrical core (1), therefore, the core holder (15) can hold the cylindrical core (1) elastically while absorbing its size error. At the same time, the core holder (15) is protruded and moved axially downward by opening the molds after the molding operation so that it can separate the upper end portion (1a) of the cylindrical core (1) naturally easily from the fitting portion of the seal ring (16).

In the embodiment of FIG. 7, the core holder (15) is so fitted in the inner circumference of the seal ring (16) as to move in the axial direction (or in the vertical direction). At the same time, an engagement member (55) such as a bolt is connected to the upper portion of the core holder (15) through the upper mold (10) by screwing means, and the upper end head portion (55a) of the engagement member (55) engages with the bottom face of a recess (56) on the upper face side of the upper mold (10) so that the engagement member (55) is supported not to move downward over a predetermined position. Between the core holder (15) and the lower face of the upper mold (10), moreover, there are overlaid and arranged a plurality of disc springs (57) which act as spring means for biasing the core holder (15) downward.

In this case, too, in the mold closing state supporting the cylindrical core (1), the core holder (15) is enabled to hold the cylindrical core (1) elastically by the biasing force of the disc springs (57). As the core holder (15) is protruded and moved axially downward by opening the molds after the molding operation, the upper end portion (1a) of the cylindrical core (1) can be easily separated from the fitting portion of the seal ring (16). Numeral (58) designates a pad in the recess (56).

Figure 8:
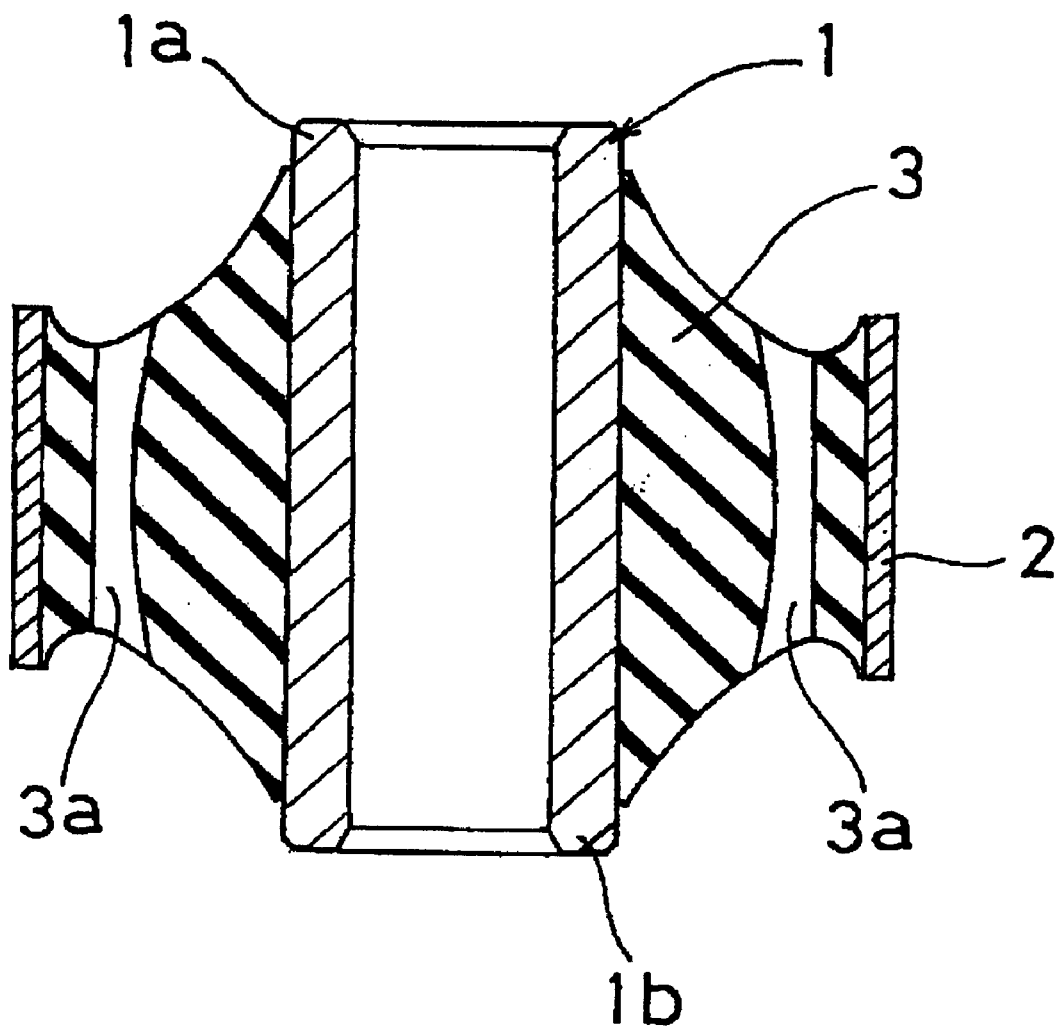
FIG. 8 is a longitudinal section showing another example of the molding with the cylindrical core to be molded.

In the molding (A) with the cylindrical core to be molded, as shown in FIG. 8, an axial through hole (3a) may be formed in the portion of the elastic rubber member (3). In this case, as individually indicated by chain lines in FIG. 6 and FIG. 7, protrusions (12b) and (22b) corresponding to the through holes may be individually formed on the upper and lower insert dies (12) and (22).

According to the molding tool of the invention, as has been described hereinbefore, the air can be discharged without fail from the vicinity of the upper end portion of the cylindrical core thereby to reduce the defective molding. Moreover, the end face can be freed from being burred, to make it unnecessary to deburr the molding. Thus, the number of steps can be drastically reduced to improve the molding efficiency.

Where many cavity forming assembles are arranged, on the other hand, the pressures for injecting and charging the molding material into the individual cavities can be equalized so that the homogeneous molding with the cylindrical core can be manufactured efficiently.

What is claimed is:

1. A molding tool for a molding with a cylindrical core, comprising: an upper mold and a lower mold adapted to be clamped directly or through an intermediate mold and including insert dies confronting each other vertically for forming the axial side faces of a molding with a cylindrical core, the insert dies of said upper and lower molds being individually provided with fitting hole portions for supporting the end portions of the cylindrical core placed therein, said lower die being provided at its fitting hole portion with a support pin fitted in said cylindrical core from the lower end opening for retaining the lower end of said cylindrical core, said upper die being provided at its fitting hole portion with a core holder confronting said support pin concentrically and fitted on the upper end of said cylindrical core, said upper and lower molds being clamped to form a cavity around the outer circumference of said cylindrical core supported by said support pin and said core holder, and a molding material such as rubber being charged into said cavity so that it may be molded integrally with said cylindrical core, wherein the molding tool comprises: a seal ring mounted in the fitting hole portion of the insert die on the side of said upper mold for fitting the outer circumference of the upper end portion of said cylindrical core while holding a slight air ventilation; a molding material injection hole leading from the upper face of said upper mold to said cavity; and an air and molding material relief hole leading from said cavity to the upper face of said upper mold.

2. A molding tool for a molding with a cylindrical core according to claim 1, wherein said molding material injection hole and said relief hole in said upper mold are disposed at positions of 180 degrees with respect to each other across the axis of said cavity.

3. A molding tool for a molding with a cylindrical core according to claim 2, further comprising a core receiving seal member mounted in the fitting core portion of the insert die on the side of said lower mold for fitting the lower end portion of said cylindrical core while holding a slight air ventilation.

4. A molding tool for a molding with a cylindrical core according to any one of claims 1 to 3, further comprising a runner plate placed separably over the upper face of said upper mold and including a molding material injecting runner groove and an air and molding material relief groove formed in the lower face of said runner plate and connected individually with said injection hole or said relief hole in said upper mold.

5. A molding tool for a molding with a cylindrical core according to claim 4, wherein said support pin can move axially upward and is supported at a fixed position by being biased downward by a return spring to be pushed up at a parting time against the biasing force of said return spring with suitable push-up means.

6. A molding tool for a molding with a cylindrical core according to any of claims 1 to 3, wherein said core holder is supported to move axially within a predetermined size range so that it can be biased axially downward by spring means to hold the cylindrical core by the biasing force of said spring means in a mold closing state supporting the cylindrical core and so that it can be moved axially downward by opening the molds to separate the upper end portion of the cylindrical core from the fitting portion of the seal ring.

7. A molding tool for a molding with a cylindrical core according to claim 4, wherein a plurality of cavity forming assemblies including the insert dies confronting each other vertically, the support pin and and core holder are arranged in said upper and lower molds, and wherein the injection holes for injecting the molding material into the cavities of the individual cavity forming assemblies are arranged equidistantly from the injection port of an injection apparatus.

8. A molding tool for a molding with a cylindrical core according to claim 7, wherein said cavity forming assemblies are arranged on a common circle around the injection port of the injection apparatus, and wherein the injection holes of the individual cavity forming assemblies are arranged on a common circle and equidistantly from said injection port.

9. A molding tool for a molding with a cylindrical core according to claim 8, wherein the relief holes of the individual cavity forming assemblies are connected by the relief grooves of said runner plate so that they have communication with the outside of the mold side.

10. A molding tool for a molding with a cylindrical core according to claim 9, wherein the relief grooves of said runner plate form a circle around the injection port of the injection apparatus and are provided at the upper ends of the individual relief holes with projection forming portions for forming small protrusions.

11. A molding tool for a molding with a cylindrical core according to claim 10, wherein the injection holes and the relief holes of the individual cavity forming assemblies are formed on radial lines extending from the injection port of said injection apparatus through the axes of said cavity forming assemblies.

* * * * *